United States Patent
Twydell

(10) Patent No.: US 6,192,825 B1
(45) Date of Patent: Feb. 27, 2001

(54) DEVICE FOR DETECTING RODENTS

(75) Inventor: Roland Stephen Twydell, Farndon (GB)

(73) Assignee: Sorex Limited, Cheshire (GB)

( * ) Notice: Subject to any disclaimer, the term of this patent is extended or adjusted under 35 U.S.C. 154(b) by 0 days.

(21) Appl. No.: 09/285,231

(22) Filed: Apr. 1, 1999

(30) Foreign Application Priority Data

Oct. 13, 1997 (GB) .................................... 9721590

(51) Int. Cl.$^7$ .................................................. A01M 31/00
(52) U.S. Cl. ........................... 116/303; 116/200; 116/309
(58) Field of Search ................................... 116/303, 309, 116/306, 201, 200, 284, 280; 43/58, 61

(56) References Cited

U.S. PATENT DOCUMENTS

| | | | |
|---|---|---|---|
| 1,292,050 | * | 1/1919 | Raney ................................. 116/303 |
| 3,778,922 | * | 12/1973 | Clark ..................................... 43/61 |

FOREIGN PATENT DOCUMENTS

| | | |
|---|---|---|
| 686 922 | 8/1996 | (CH) . |
| 0 395 135 | 10/1990 | (EP) . |
| 2 544 586 | 10/1984 | (FR) . |

* cited by examiner

Primary Examiner—Diego Gutierrez
Assistant Examiner—Stanley J. Pruchnic, Jr.
(74) Attorney, Agent, or Firm—Wenderoth, Lind & Ponack, L.L.P.

(57) ABSTRACT

A device for the detection of rodents includes a generally hollow container having an aperture to allow entry into the container and exit from the container by a rodent, and an indicator to indicate that a rodent has exited the container through the aperture. Preferably, the indicator comprises a flexible barrier located across the aperture. At least part of this flexible barrier is capable of being displaced from an interior position of the container to an exterior position of the container by the movement of a rodent through the aperture from the interior to the exterior of the container. Thus, the device is able to detect rodent infestation and is able to provide positive evidence of a rodent having been present inside the container.

20 Claims, 1 Drawing Sheet

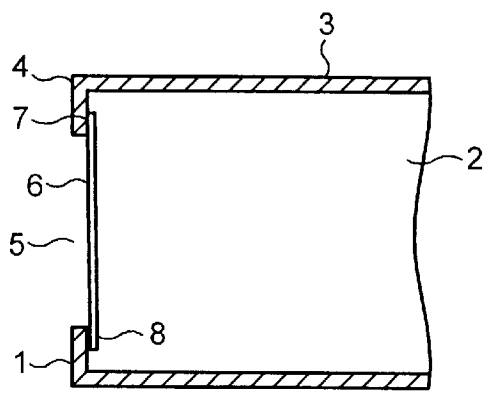
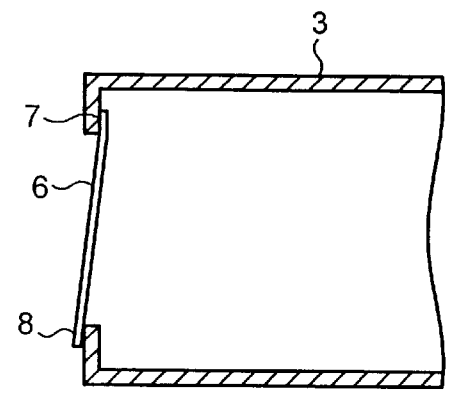
FIG. 1  FIG. 2
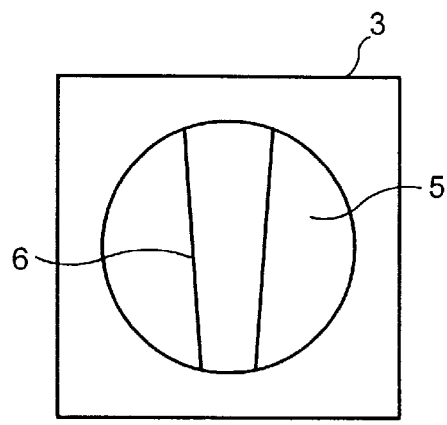
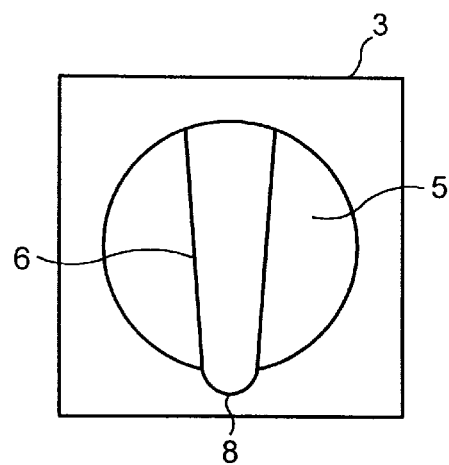
FIG. 3  FIG. 4

DEVICE FOR DETECTING RODENTS

BACKGROUND OF THE INVENTION

The present invention relates to a device for detecting rodents.

The positive detection of rodent infestation, before rodenticides are employed, is desirable. The Food Industry, for instance, is particularly sensitive about this and prefers rodenticides to be used only after an infestation has been positively identified by other means. Furthermore, detection of rodents during a control program, e.g., rodenticide baiting, can be a useful aid to confirm that the bait selected is appropriate. Unfortunately, when a bait is used the absence of bait consumption does not always indicate successful control.

There are four main methods currently employed to detect rodent infestation. These are:

1. census baiting using untreated foodstuffs or blank rodenticide formulations (i.e., formulations containing no active ingredient);
2. tracking patches where small areas of loose particulate matter (for example, gypsum, silversand and carbon black) are laid down to detect footprints;
3. visual inspection of a suspected site to identify rodent damage, droppings, hair or other signs; and
4. sophisticated detectors which employ complex and expensive electronic equipment (e.g., detectors which rely on detecting body heat radiated by a rodent positioned close to a sensor).

All of these main methods have drawbacks. For instance, census baiting relies on the acceptance of the bait by the rodents and, as is the case with rodenticide baiting, negative results do not prove the absence of rodents. The use of census baits of a similar type to a rodenticidal formulation can also reduce the acceptance of that rodenticidal formulation, if subsequently used. Tracking methods currently employ "messy" dusts, dyes or pigments that are sensitive to environmental factors such as moisture, air movement and vibration. Furthermore, experience has shown that excessive use of tracking dusts, apart from the mess created, can be repellent to rodents. Visual inspection methods are time consuming and require considerable expertise to distinguish between "old " and "fresh " signs. Live rodents are rarely seen except where the infestation level is high. Finally, sophisticated electronic detectors are costly, consume power and require expert maintenance.

SUMMARY OF THE INVENTION

The aim of the present invention is to provide a device for detecting rodents which does not suffer from the disadvantages associated with the current methods discussed above, and which can provide positive evidence of the presence or absence of a rodent infestation.

Accordingly, the present invention provides a device for the detection of rodents comprising a generally hollow container having an aperture to allow entry into the container and exit from the container by a rodent, and having an indicator to indicate that a rodent has exited the container through the aperture.

Typically, the indicator comprises a flexible barrier located across the aperture and will have a portion which is capable of being displaced through the aperture from an interior position in the container to an exterior position of the container by the movement of a rodent through the aperture from the interior to the exterior of the container. The detector would be set, before use, by locating the displaceable portion of the barrier at the interior of the aperture, inside the container. When a rodent passes through the aperture, although the barrier will be disturbed it will not be displaced through the aperture. However, when the rodent exits the container the flexible barrier will be pushed by the rodent such that the displaceable portion is pushed through the aperture, and it remains located on the exterior of the container after the rodent has departed. If the same or another rodent subsequently enters the container through the aperture, the indicator will be displaced such that it will be relocated on the interior of the container. The rodent, when it exits will, however, displace the flexible barrier so that it remains outside the aperture unless a rodent enters the container. Thus, once the position of the indicator has been set initially before use, any displacement of the indicator to an exterior position will be positive evidence that a rodent has entered and then exited the detector device.

BRIEF DESCRIPTION OF THE DRAWINGS

An embodiment of the device of the present invention will now be described by reference to the accompanying drawings in which:

FIG. 1 shows a partial cross-sectional view of a device according to the present invention with the indicator set in the initial position;

FIG. 2 shows a view similar to that shown in FIG. 1 except the indicator has been displaced by passage of a rodent from the interior to the exterior of the device;

FIG. 3 shows a front view of the device in the state shown in FIG. 1; and

FIG. 4 shows a front view of the device in the state shown in FIG. 2.

DETAILED DESCRIPTION OF THE INVENTION

As shown in FIG. 1, the device 1 comprises a generally hollow box 2 having walls 3 and a generally square cross-section. Hollow containers of other shapes such as tubular vessels may also be used in the invention. A front wall 4 is provided with an aperture 5. To the front wall 4 is fixed an indicator 6 in the form of a flap which is suspended across the aperture 5.

The box 2 and the aperture 5 are of an appropriate size for easy access to all foraging stages of the rodent pest to be detected. The dimensions of the box and the aperture will, therefore, depend on the size of the rodent to be detected (for instance, whether it is a mouse or a rat).

The indicator 6 as shown in FIG. 1 comprises a flap in the shape of a tongue, preferably formed of a flexible sheet of plastic material. However, an indicator having a different shape from that shown in FIG. 1 may be employed. It is also within the scope of the invention to use an indicator comprising two or more separate portions which are hinged together so that it is flexible and has an end portion that can be displaced from a location inside the box to a location outside the box. It is also within the scope of this invention to use an indicator of filamentous design with the same attributes and function of the aforementioned flap. The material, dimensions and form of mounting of the indicator are such that it offers minimal physical obstruction to a rodent entering the box while ensuring that the free end portion of the indicator will remain protruding from the aperture when the rodent leaves the box. The indicator should, of course, be constructed so that it cannot be displaced by foraging insects, air movement or physical shock. The indicator 6 will be fixed by one of its edges 7 to a point adjacent to the aperture in the wall of the box such that the end 8 of the indicator 6 remote from the fixed edge is capable of being displaced through the aperture.

The device, though shown in FIG. 1 as having one aperture and one flap may have more than one aperture to allow entry into and exit from the box by a rodent. Each aperture will, of course, be provided with one, or possibly, more than one indicator.

Before the device is left in a suitable location for the detection of rodents, the indicator 6 will be set such that it lies totally within the box. This is shown in FIGS. 1 and 3. Any rodent entering the box through the aperture 5 will push inwards against the indicator 6. However, when the rodent exits the box it will push the indicator through the aperture, and the thus-displaced end portion (8) of the indicator will remain protruding through the aperture as an indicator of the fact that a rodent has entered and has left the box (FIGS. 2 and 4).

The device may be used empty as a 'stand-alone' device or may contain lures, food-stuffs or bait, if desired.

There are many advantages of the device of the present invention, including reliable detection of foraging rodents without relying on the feeding behavior of the rodents. Furthermore, the device is easy to set and reset, is clean, and will not provide false indications. The device can be used as a 'stand-alone' detector, or as a monitored bait box, so it is flexible in this regard. The device can also be used in a baiting program to optimize bait selection. Finally, because the construction of the device is relatively simple, the device is very economical.

What is claimed is:

1. A device for detecting rodents comprising:
   a hollow container having an aperture for allowing a rodent to enter into said hollow container and exit from said hollow container; and
   an indicator for signaling that a rodent has exited from said hollow container through said aperture, said indicator being formed as a flexible barrier and being arranged across said aperture such that at least a portion of said indicator is adapted to move from an interior position of said container to an exterior position of said container by movement of the rodent through said aperture.

2. The device of claim 1, wherein said indicator comprises a flap having a first portion fixed to said hollow container at a position adjacent to said aperture, and having a second portion remote from said first portion, said second portion being loose so as to move between the interior position and the exterior position.

3. The device of claim 2, wherein said flap comprises a flexible plastic material.

4. The device of claim 3, wherein said hollow container has at least two apertures, each of said apertures having a flap for signaling that a rodent has exited from said hollow container through said each of said apertures.

5. The device of claim 2, wherein said first portion of said flap and said second portion of said flap are connected by a hinge.

6. The device of claim 5, wherein said hollow container has at least two apertures, each of said apertures having a flap for signaling that a rodent has exited from said hollow container through said each of said apertures.

7. The device of claim 2, wherein said hollow container has at least two apertures, each of said apertures having a flap for signaling that a rodent has exited from said hollow container through said each of said apertures.

8. The device of claim 1, wherein said indicator comprises at least one cross-linked filament.

9. The device of claim 8, wherein said hollow container has at least two apertures, each of said apertures having an indicator for signaling that a rodent has exited from said hollow container through said each of said apertures.

10. The device of claim 1, wherein said hollow container has at least two apertures, each of said apertures having an indicator for signaling that a rodent has exited from said hollow container through said each of said apertures.

11. A device for detecting rodents comprising:
    a hollow container having at least one aperture; and
    an indicator having a first portion and a second portion remote from said first portion, said first portion of said indicator being pivotally attached to said hollow container at said aperture such that said second portion is operable to rest at an interior position of said container and to rest at an exterior position of said container, and is operable to pivot between the interior position and the exterior position.

12. The device of claim 11, wherein said indicator comprises a flap.

13. The device of claim 12, wherein said flap comprises a flexible plastic material.

14. The device of claim 13, wherein said hollow container has at least two apertures, each of said apertures having a flap.

15. The device of claim 12, wherein said first portion of said flap and said second portion of said flap are connected by a hinge.

16. The device of claim 15, wherein said hollow container has at least two apertures, each of said apertures having a flap.

17. The device of claim 12, wherein said hollow container has at least two apertures, each of said apertures having a flap.

18. The device of claim 11, wherein said indicator comprises at least one cross-linked filament.

19. The device of claim 18, wherein said hollow container has at least two apertures, each of said apertures having an indicator.

20. The device of claim 11, wherein said hollow container has at least two apertures, each of said apertures having an indicator.

* * * * *